United States Patent [19]
Prucnal

[11] Patent Number: 5,917,979
[45] Date of Patent: Jun. 29, 1999

[54] ASYMMETRIC OPTICAL LOOP MIRROR EXHIBITING THRESHOLD DISCRIMINATION FOR SEPARATION OF INPUT PULSES OF DIFFERING MAGNITUDES

[75] Inventor: Paul R. Prucnal, Princeton, N.J.

[73] Assignee: The Trustees of Princeton University, Princeton, N.J.

[21] Appl. No.: 08/772,558

[22] Filed: Dec. 26, 1996

[51] Int. Cl.$^6$ ...................................................... G02B 6/26
[52] U.S. Cl. ........................................... 385/122; 359/115
[58] Field of Search ................................. 385/122, 123; 359/115, 109, 119

[56] References Cited

U.S. PATENT DOCUMENTS

| | | | |
|---|---|---|---|
| 4,881,788 | 11/1989 | Doran ....................................... | 385/122 |
| 5,493,433 | 2/1996 | Prucnal et al. ........................... | 359/123 |
| 5,687,260 | 11/1997 | ZLiedenbaum ........................... | 385/16 |

OTHER PUBLICATIONS

Electronics Letters, vol. 30, No. 13 (1994) pp. 1084–1085, N. J. Smith et al., "Picosecond Soliton Propagation Using Nonlinear Optical Loop Mirros as Intensity Filters" no month.
Optics Letters, vol. 13, No. 1 (Jan. 1988) pp. 56–58, N. J. Doran et al., "Nonlinear–Optical Loop Mirror".
Optics Letters, vol. 14, No. 14 (Jul. 15, 1989) pp. 754–756, K. J. Blow et al., "Experimental Demonstration of Optical Soliton Switching in an All–Fiber Nonlinear Sagnac Interferometer".

*Primary Examiner*—Rodney Bovernick
*Assistant Examiner*—Ellen E. Kang
*Attorney, Agent, or Firm*—Ohlandt, Greeley, Ruggiero & Perle

[57] ABSTRACT

An optical signal amplitude discriminator incorporating the invention includes an optical loop having a nonlinear optical amplifier positioned a distance $\Delta x$ from the loop's midpoint. The nonlinear optical amplifier is responsive to an applied optical saturating signal to exhibit an altered index of refraction which persists for a limited duration and induces a phase shift in an applied optical signal propagating therethrough. An input source applies both data and clock pulses to an unbalanced coupler, with the clock pulses having an input energy that is greater than the saturation level of the nonlinear optical amplifier and the data pulses manifesting an input energy that is less than the saturation level. The nonlinear optical amplifier amplifies and phase delays the first incident clock pulse. The counter-propagating clock pulse experiences a large phase shift and reaches the input coupler at a displaced time and results in a coupling of the clock pulse to the output terminal. Data pulses, exhibiting a lower energy, experience only a small relative phase shift and constructively interfere at the loop coupler.

6 Claims, 5 Drawing Sheets

ASYMMETRIC OPTICAL LOOP MIRROR EXHIBITING THRESHOLD DISCRIMINATION FOR SEPARATION OF INPUT PULSES OF DIFFERING MAGNITUDES

The United States Government has rights in the invention described and claimed herein as a result of support by the Advanced Research Project Agency, under contract F19628-94-C-0045.

FIELD OF THE INVENTION

This invention relates to optical switching devices and, more particularly, to an optical demultiplexer that is capable of discriminating between pulses of differing magnitudes.

BACKGROUND OF THE INVENTION

The performance of ultrafast, optical time division multiplexed (TDM) networks depends strongly on the recovery of timing information. Conventional electronic clock recovery schemes often do not have sufficient speed to accommodate ultra-fast TDM networks with through-puts in the regions of hundreds of gigabits per second. One technique for ultra-fast timing employs the transmission of a clock signal simultaneously with the data and requires the receiver to separate the clock and data signals. The clock and data can be distinguished by wavelength polarization or amplitude, but each method has a problem which needs to be addressed.

If the clock and data have different wavelengths, then fiber dispersion causes clock skew which varies with transmission distance. If the clock and data have different polarizations, then polarization control is required at the receiver. If the clock and data have different amplitudes (and the clock occupies a designated time slot in the TDM frame or packet), an ultra-fast intensity thresholding device is required to extract the clock pulses at the receiver.

Non-linear optical loop mirrors (NOLMs) are good candidates for optical thresholding because they exhibit ultra-fast switching capabilities. However, they often require high switching energies or long interaction lengths (up to several kilometers) to achieve the switching action. From a practical standpoint, available switching energy is generally limited because high energy pulses experience nonlinear interactions during transmission, and such interactions causing unacceptable timing jitter. For instance, picosecond duration pulses must have less than one picoJoule of energy to avoid nonlinear effects over a 10 kilometer distance.

Various designs of NOLMs can be found described in the following references: "Picosecond Soliton Propagation Using Nonlinear Optical Loop Mirrors as Intensity Filters", Smith et al., Electronics Letters, Vol 30, No. 13, pp 1084, 1085, 1994; "Nonlinear Optical Loop Mirror", Doran et al., Optics Letters, Volume 13, No. 1, January 1988, pages 56–58; and "Experimental Demonstration of Optical Soliton Switching in an All-Fiber Nonlinear Sagnac Interferometer", Blow et al., Optics Letters, Volume 14, No. 14, Jul. 15, 1989, pages 754–756.

Some of the switching devices described in the aforementioned papers employ an optical loop mirror wherein a coupler that is used to input optical pulses exhibits an asymmetric coupling characteristic. The Blow et al. system employs a fiber loop in one arm of the optical mirror to achieve an unbalance in phase delays, thereby achieving an ability to output pulses on the basis of amplitude discrimination.

U.S. Pat. No. 5,493,433 to Prucnal et al., assigned to the same assignee as this application, describes an optical asymmetric demultiplexer which includes an optical loop having a nonlinear optical element positioned in one arm thereof. A coupler is positioned in the loop and injects a gating pulse which causes a change in the optical property of the nonlinear optical element. A further coupler receives a series of input optical pulses and induces in the optical loop, a pair of counter-propagating pulses in response to each input pulse. Control circuitry causes a gating pulse to be applied to the optical loop that is timed to switch the nonlinear optical element from a first to a second state after one of the pair of counter-propagating pulses has passed through the nonlinear optical element, but before the other counter-propagating pulse reaches the nonlinear optical element. Thus, one counter-propagating pulse is affected by the second state of the nonlinear optical element and the other counter-propagating pulse is not. As a result, the two pulses arrive back at the input coupler, exhibiting an offset phase. The coupler responds by coupling the out-of-phase pulse to an output fiber. If no gating signal is applied to alter the state of the nonlinear element, then the pulses which counter-propagate around the loop experience an identical phase shift, constructively interfere at the input coupler and are reflected back along the input fiber.

While the Prucnal et al. system provides extraordinarily high speed switching of optical pulses, an additional coupler is required in the optical loop mirror to achieve the switching action. Other non-linear optical loop mirrors, as indicated above, require either high switching energy or long interaction lengths.

Accordingly, it is an object of this invention to provide a nonlinear optical loop mirror which is adapted to discriminate pulses on the basis of amplitude.

It is another object of this invention to provide a nonlinear optical loop mirror which employs an intensity thresholding device that exhibits a low switching energy and a short interaction length.

SUMMARY OF THE INVENTION

An optical signal amplitude discriminator incorporating the invention includes an optical loop having a nonlinear optical amplifier positioned a distance $\Delta x$ from the loop's midpoint. The nonlinear optical amplifier is responsive to an applied optical signal manifesting an energy level sufficient to cause saturation thereof, to exhibit a substantially altered index of refraction which persists for a limited duration. Under such conditions, a substantial phase shift is induced in an applied optical signal propagating therethrough. A coupler, exhibiting an unbalanced coupling characteristic, applies an input signal to first and second terminals of the optical loop. An input source applies both data and clock pulses to the input terminal of the coupler, with the clock pulses manifesting an input energy that is greater than the saturation level of the nonlinear optical amplifier and the data pulses manifesting an input energy that is less than the saturation level. The input coupler causes a small portion of a clock pulse to be coupled into the shorter leg of the optical loop. The nonlinear optical amplifier responds by amplifying and phase delaying the first incident clock pulse. The counter-propagating clock pulse reaches the nonlinear optical amplifier a short time later, as determined by an offset $\Delta x$, causing a large depletion of the carrier concentration and experiences a large phase shift, i.e., a $\pi$ relative phase shift. This results in the counter-propagating pulse reaching the input coupler at a displaced time and results in a coupling of the clock pulse to the output terminal. Data pulses exhibit a significantly lower energy magnitude, do not equal or exceed the saturation energy of the nonlinear optical amplifier, experience only a small relative phase shift and constructively interfere at the loop coupler.

DETAILED DESCRIPTION OF THE INVENTION

Figure 1:
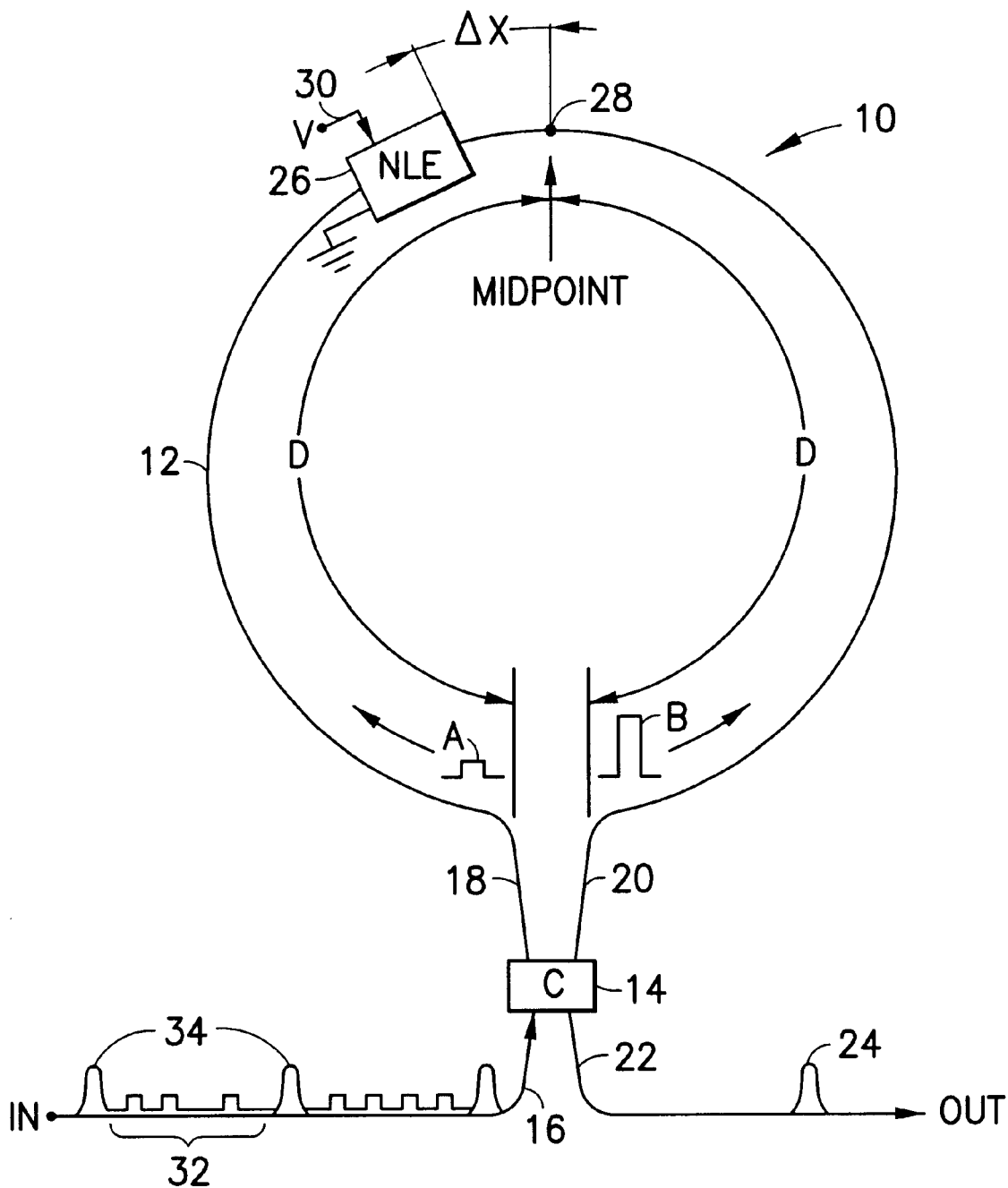
FIG. 1 is a schematic diagram illustrating a system that incorporates the invention hereof.

Referring to FIG. 1, an optical signal amplitude discriminator is shown that is capable of separating high amplitude clock pulses from lesser amplitude data pulses. The amplitude discriminator includes a nonlinear optical element which is asymmetrically placed within a short fiber loop. The optical discriminator requires low levels of applied energy and is small enough to be integrated on a semiconductor chip.

Optical amplitude discriminator 10 employs a loop mirror structure which includes an optical fiber loop 12 that is connected to a 2×2 coupler having four ports, i.e., 16, 18, 20 and 22. Coupler 14 is asymmetric in that only a small percentage ($\alpha$) of an input optical signal on port 16 is coupled into port 18, while a greater percentage (1-$\alpha$) is coupled into port 20. As will become hereafter apparent, a preferred range for $\alpha$ is from 0.1 to 0.3 and a most preferred range is 0.15 to 0.2.

When an optical pulse appears at port 16, coupler 14 splits the pulse into pulses A and B which counter-propagate in optical loop 12. Disregarding other effects within optical loop 12, when pulses A and B return to coupler 14, via ports 18 and 20, they constructively interfere in such a way that all of the incident optical power will re-emerge out of input port 16. However, an optical pulse 24 will emerge from output port 22 if one or the other of pulses A or B experiences an absorption and/or phase delay relative to its counter-propagating pulse.

A nonlinear optical element (NLE) 26 is positioned within optical loop 12 a distance $\Delta x$ from midpoint 28 of optical loop 12. Midpoint 28 is equidistantly positioned (by distances D) from ports 18 and 20 of coupler 14. NLE 26 is preferably a semiconductor optical amplifier to which a bias voltage V is applied via line 30. Under such conditions, NLE 26 is maintained in a condition to be stimulated into an amplifying action upon receipt of an optical pulse.

More specifically, the applied bias current to NLE 26 produces an excited population of atoms which respond to an incident light pulse by being depleted and giving off energy. That energy is manifest as an amplified light pulse in the known manner. Further, application of an optical pulse having a magnitude sufficient to approach saturation levels in NLE 26, causes a substantial change in the refractive index thereof. Lower energy pulses do not create such substantial refractive index changes.

As will hereafter be understood, applied clock pulses are adjusted to have sufficient energy to cause the aforesaid change in refractive index in NLE 26, but data pulses are adjusted to have little or no effect thereon. As a result, data pulses are discriminated in favor of clock pulses.

As indicated above, unbalanced coupler 14 splits an incoming signal pulse and causes a weaker version of the pulse (i.e., A) to exit from port 18. Pulse A propagates in a clockwise direction and reaches NLE 26 before pulse B (which is propagating in a counterclockwise direction). By properly choosing the $\alpha$ of coupler 14, the energy content of pulse A is adjusted so as to see only a small index change in passing through NLE 26. Further, by proper choice of $\alpha$, the energy of pulse A can be such that the gain of NLE 26 balances the intensity difference between pulses A and B so that when pulse A returns to port 20, its energy magnitude is approximately equal to pulse B.

The offset distance $\Delta x$ of NLE 26 from midpoint 28 insures that weaker optical pulse A enters NLE 26 before stronger pulse B. The time interval $2\Delta x/c$ should be less than the interval between the clock and data pulses (where: c=speed of light in the fiber). The timing difference between the arrival times of pulses A and B determines the switching speed of optical signal amplitude discriminator 10.

The input signal train to input port 16 comprises a plurality of data pulses 32 and intermittent clock pulses 34. Clock pulses 34 are adjusted to have substantially greater energy than data pulses 32. Upon receipt of a clock pulse 34 at input terminal 16, unbalanced coupler 14 induces a corresponding pulse A to exit from port 18 and a corresponding pulse B to exit from port 20. Pulse A reaches NLE 26 first, causing a small change in the index of refraction therein. As a result, pulse A experiences a small phase shift and continues propagating in a clockwise direction about optical loop 12. A short time later (i.e., $2\Delta x/c$), pulse B arrives at NLE 26 and experiences a large phase shift (approximately $\pi$) while passing therethrough. Pulse B then continues propagating in a counterclockwise direction. Thus, when pulse A returns to port 20, it's phase is offset by approximately $\pi$ with respect to pulse B.

After pulse B passes through NLE 26, the carrier concentration and gain of NLE 26 slowly return to their original values. Weak data pulses passing through NLE 26 after this recovery experience a minimal phase shift. Any signal appearing at input ports 18 and 20 will be in-phase, both signals having experienced an identical phase shift. As a result, coupler 14 will direct the return signals to input port 16 (where they are ignored). Because the data pulses always are in phase when they reach coupler 14 (after counter-propagation around loop 12), they constructively interfere and output from port 16.

Figure 2A:
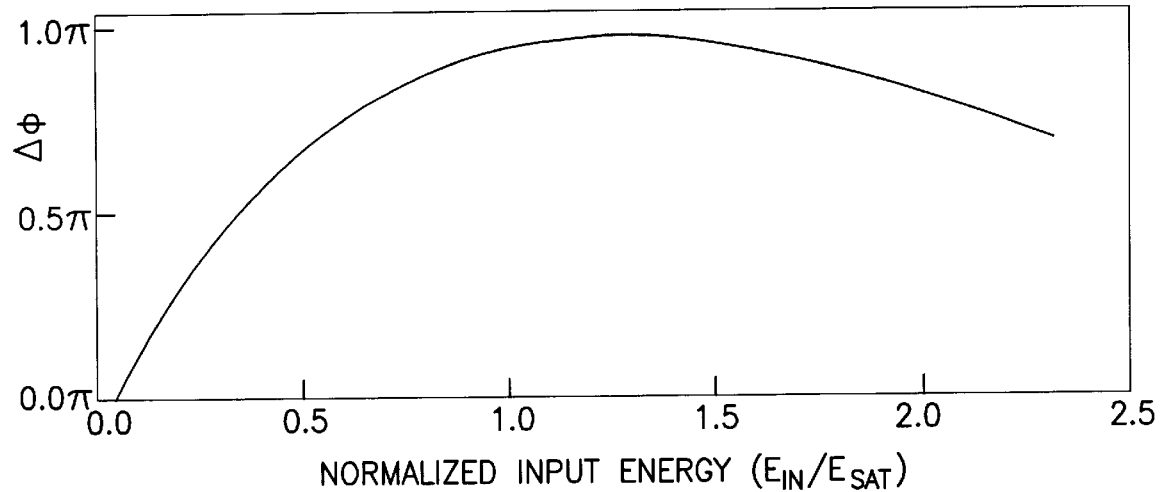
FIG. 2(a) is a plot of normalized input energy and phase delay created by a nonlinear optical amplifier used in the invention hereof.
Figure 2B:
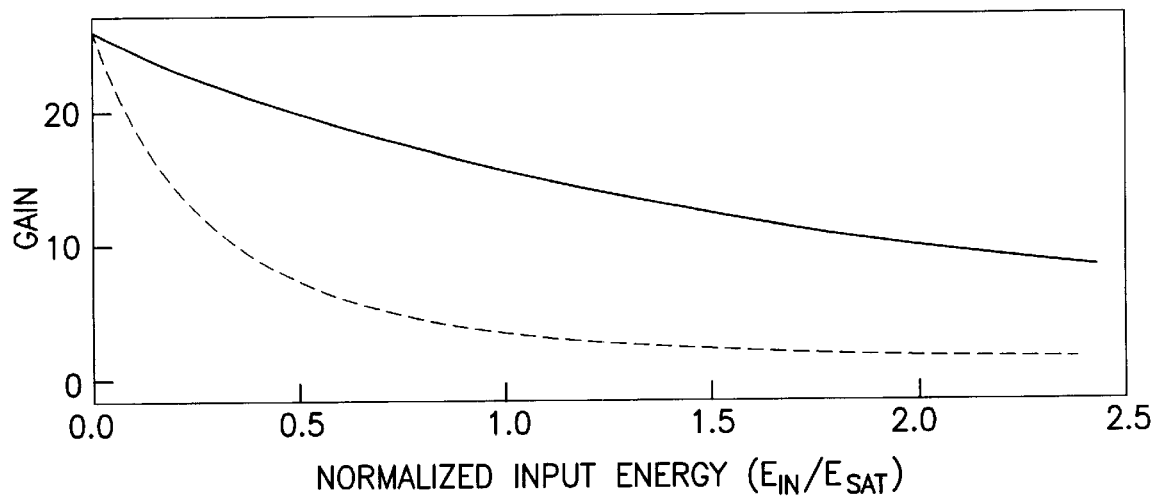
FIG. 2(b) is a plot of normalized input energy versus gain for a nonlinear optical amplifier used in the invention hereof.

The operation of optical amplitude discriminator 10 has been simulated, as a function of input pulse energy, splitting ratio $\alpha$ and bias current. An optimized case was found when the splitting ratio $\alpha$ was 0.18 and the driving bias current of NLE 26 was 100 ma. As shown in FIG. 2(a), the differential phase shift $\Delta\phi$ between counter-propagating pulses approaches $\pi$ as the input goes from 1.0 to 1.5 $E_{sat}$ (where $E_{sat}$ is the saturation energy of NLE 26). This is due to the differential gain experienced by the two counter-propagating pulses in NLE 26 as shown in FIG. 2(b).

The gain for each pulse (solid line for pulse A and dashed line for pulse B) behaves similarly, but weaker pulse A has a 6–8 dB advantage over stronger pulse B. This induces a $\pi$ phase shift between pulses A and B and helps to compensate the intensity difference resulting from unbalanced coupler 14.

Figure 2C:
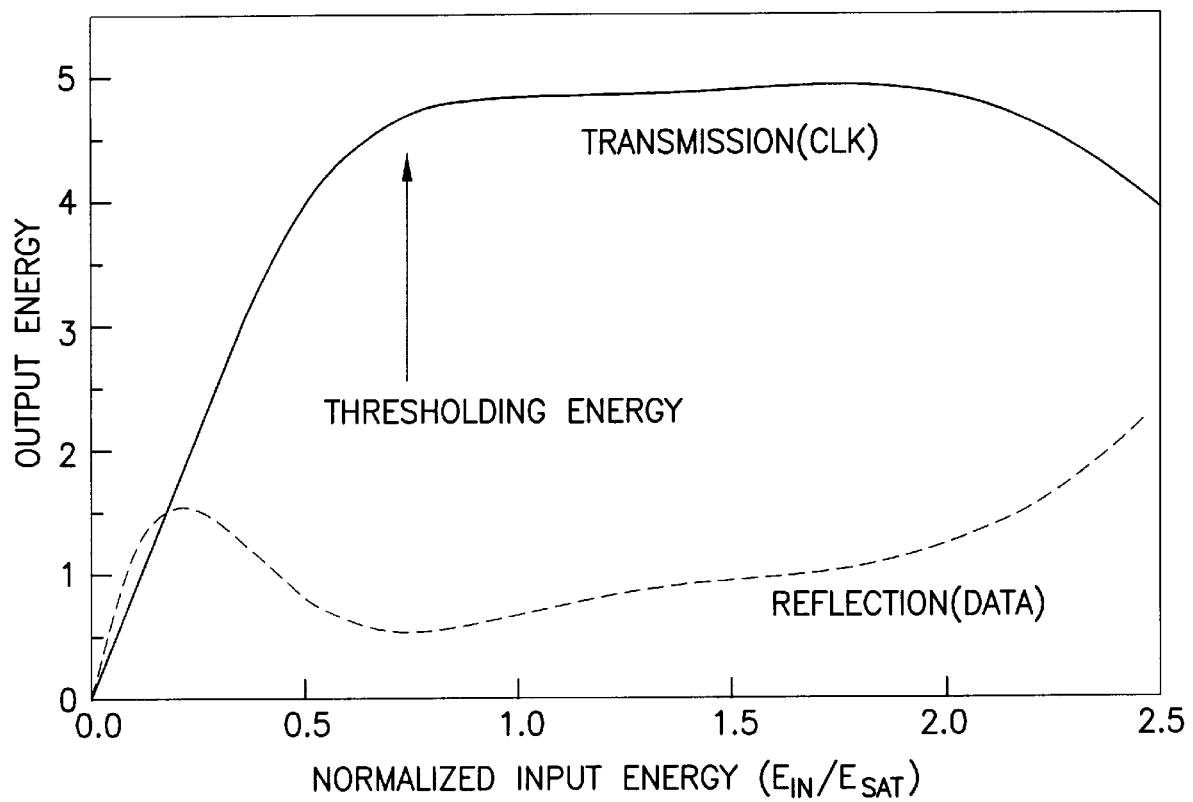
FIG. 2(c) is a plot of normalized input energy versus output energy for the optical loop mirror employing the invention hereof.

FIG. 2(c) shows the transmitted and reflected pulse energy as a function of input energy (where the transmitted energy exits from port 22 and the reflected energy exits from port 16). At low input power, the reflected energy reaches a maximum at an input of 0.1 $E_{sat}$ where the linear transmission is 40%. As the input energy is increased, the transmitted energy rises much faster than linearly, until it begins to saturate at an input energy of 0.75 $E_{sat}$. Therefore, a flat switching window is obtained over a wide input range. Thus, an ideal thresholding performance is achieved including rectification and amplification of the larger magnitude clock pulses through optical signal amplitude discriminator 10. The contrast ratio between the transmitted and reflected portions is about 10–13 dB. This insures that about 95% of a strong pulse can be removed from the data stream.

Figure 3:
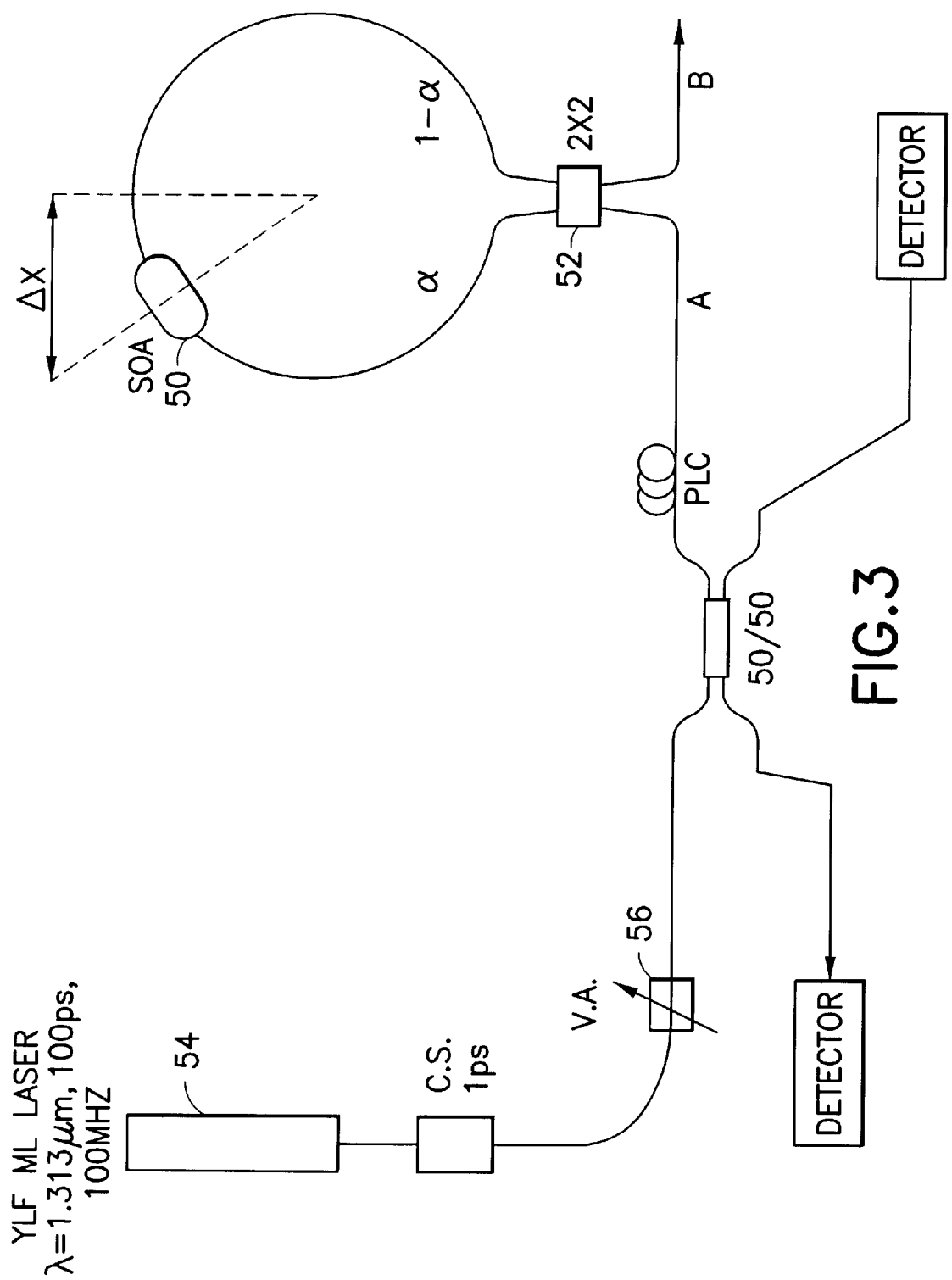
FIG. 3 is a more detailed system diagram illustrating an experimental system used to confirm the operation of the invention.

An experimental setup was implemented as shown in FIG. 3. The optical loop included an unbalanced coupler 52, and an InGaAsP semiconductor optical amplifier (SOA) 50 positioned therein. 2×2 coupler 52 exhibited a splitting ratio α=0.18. SOA 50 was 500 micrometers long and was supplied with a bias current of 100 ma. SOA 50 was precisely placed in the optical loop such that the switching window was equal to 14 picoseconds.

Without SOA 50, the intrinsic loss of the loop was about 6 dB. Two picosecond optical pulses were generated by compressing 1.313 micrometer output pulses from a mode-locked 100 MHz Nd:YLF laser 54. A variable attenuator 56 was used to produce different input pulse energies.

Figure 4:
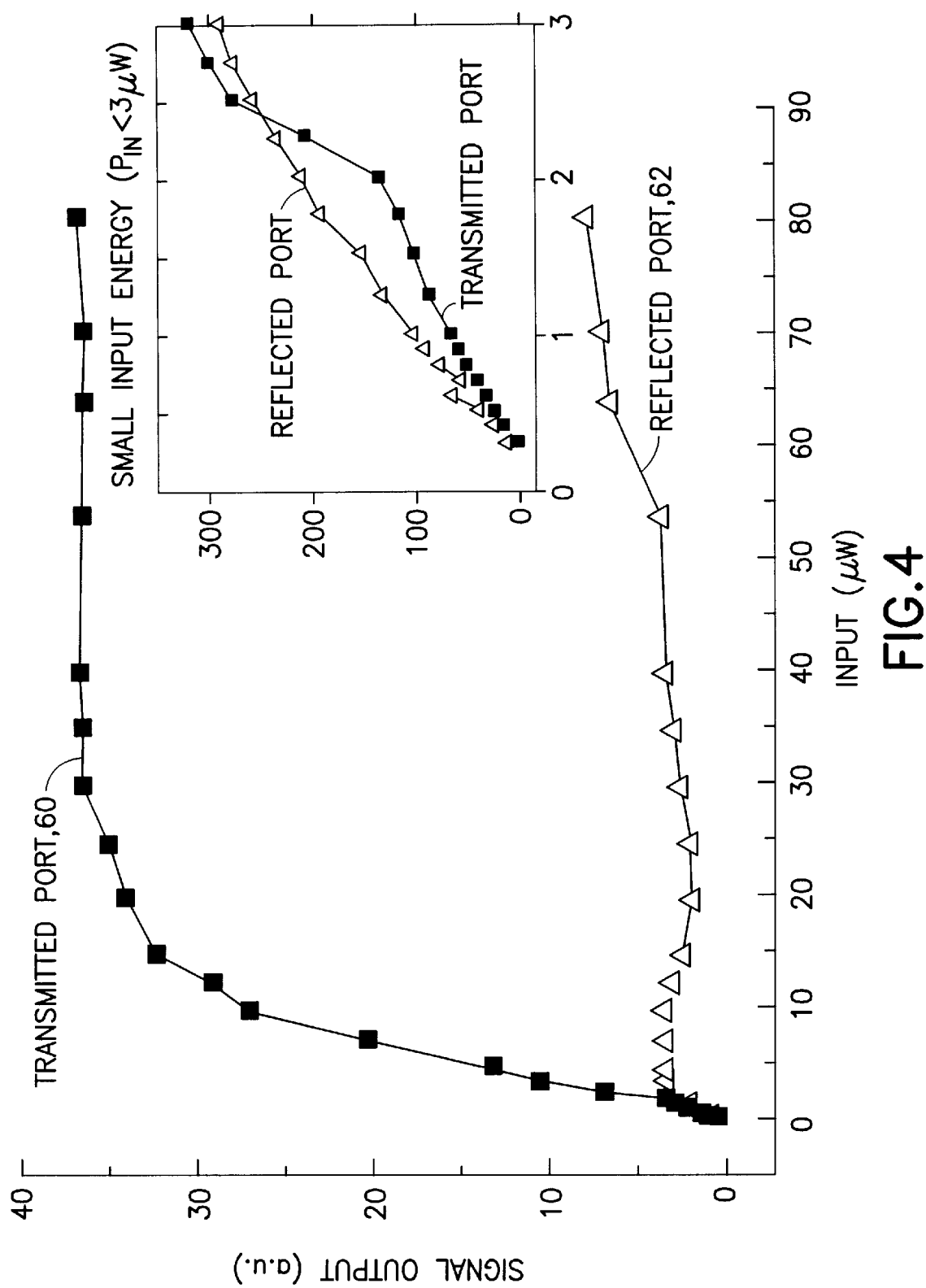
FIG. 4 are plots of input power versus signal output for the experimental system of FIG. 3.

The experimental results are shown in FIG. 4 wherein input energy is plotted against signal output in arbitrary units. The transmitted signal 60 increases with increased input pulse energies. At a threshold energy of 150 femtoJoules, the reflected signal 62 reaches a value of 180 femtoJoules and then saturates as the input increases up to 300 femtoJoules. Reflected signal 62 reaches a maximum value as the input increases to 15 femtoJoules. If the clock signals are set at 150 femtoJoules and data at 15 femtoJoules, the clock-to-data ratio of the transmitted signals is about 20. Within the switching window defined by Δx, the contrast ratio between the transmitted and reflected signal is about 13.5 dB. This indicates that the device can be used to remove 96% of the clock signal from the data signal.

Assuming that the transmitted output is fixed at a certain value above the threshold of SOA 50, the optical signal amplitude discriminator can also be used to condition an uneven optical pulse train. Furthermore, reduction of the bias current to SOA 50 increases the thresholding energy, which provides a simple and fast dynamic adjustment of the device in system applications.

In summary, the experiment indicates that 120% transmission and 13.5 dB contrast ratio can be achieved for the switched signal, at a low switching energy of 150 femtoJoules.

It should be understood that the foregoing description is only illustrative of the invention. Various alternatives and modifications can be devised by those skilled in the art without departing from the invention. For instance, the optical signal amplitude discriminator described above can be configured either as an optical fiber or an integrated optical wave guide, or can be further configured in such a manner that the optical signals are propagated in free space both towards and from NLE 26. Further, other nonlinear optical materials can be used for NLE 26 in place of the semiconductor amplifier. Accordingly, the present invention is intended to embrace all such alternatives, modifications and variances which fall within the scope of the appended claims.

I claim:

1. An optical signal amplitude discriminator comprising:

an optical loop having a first terminal, a second terminal and a midpoint;

nonlinear optical means positioned in said loop a distance Δx from said midpoint and responsive to an applied optical signal manifesting an energy of about a saturation magnitude, to exhibit a substantially altered index of refraction which persists for a limited duration and enables said nonlinear optical means to induce a substantial phase shift in an applied optical signal;

coupler means coupled to said first terminal and said second terminal, having an input terminal and an output terminal, said coupler means positioned a distance (D−Δx) from said nonlinear optical means at said first terminal and a distance (D+Δx) from said nonlinear optical means at said second terminal, said coupler means constructed to couple a percentage α of an input signal to said first terminal and 1−α to said second terminal;

input means for applying to said input terminal, first pulses manifesting an input energy greater than said saturation magnitude and second pulses manifesting a second energy magnitude that is less than said saturation magnitude, an input energy of a first pulse times α at least equaling about said saturation magnitude; and whereby a first pulse applied to said input terminal results in counterpropagating signals being induced in said optical loop which experience a substantial relative phase shift during a signal propagation time related to Δx, causing a pulse transmission from said output terminal, whereas counterpropagating signals in said optical loop which result, from second pulses do not experience said substantial relative phase shift and are reflected.

2. The optical signal amplitude discriminator as recited in claim 1, wherein said nonlinear optical means is a semiconductor optical amplifier having a bias current applied which establishes said saturation magnitude.

3. The optical signal amplitude discriminator as recited in claim 1 wherein said coupler means exhibits a percentage α within the range of 0.1 to 0.3.

4. The optical signal amplitude discriminator as recited in claim 1 wherein said coupler means exhibits a percentage α in the range of 0.15 to 0.20.

5. The optical signal amplitude discriminator as recited in claim 1 wherein said optical loop is configured as either an optical fibre or an integrated optical waveguide.

6. The optical signal amplitude discriminator as recited in claim 1 wherein said optical loop is configured in free space.

* * * * *